F. W. SPERR, Jr.
RECOVERING CYANOGEN AND SULFUR COMPOUNDS FROM FLUIDS.
APPLICATION FILED OCT. 30, 1915.
1,213,429. Patented Jan. 23, 1917.
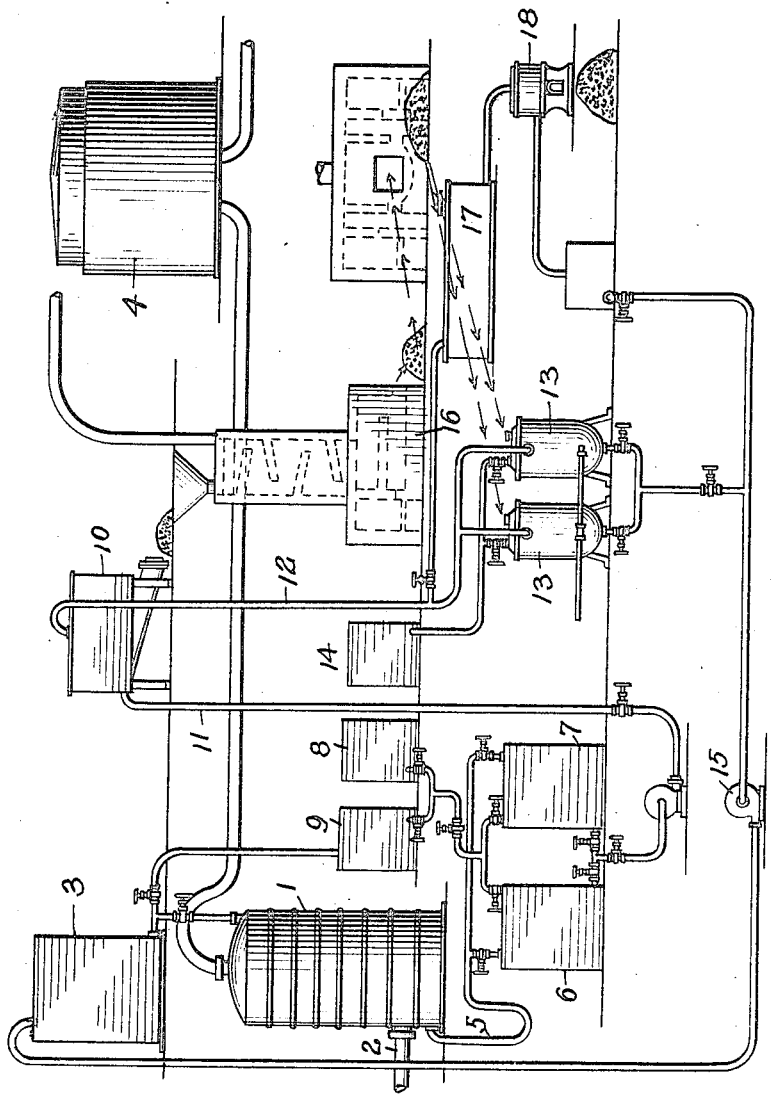

UNITED STATES PATENT OFFICE.

FREDERICK W. SPERR, JR., OF OAKMONT, PENNSYLVANIA.

RECOVERING CYANOGEN AND SULFUR COMPOUNDS FROM FLUIDS.

1,213,429.  Specification of Letters Patent.  Patented Jan. 23, 1917.

Application filed October 30, 1915. Serial No. 58,880.

*To all whom it may concern:*

Be it known that I, FREDERICK W. SPERR, Jr., residing at Oakmont, in the county of Allegheny and State of Pennsylvania, a citizen of the United States, have invented or discovered certain new and useful Improvements in Recovering Cyanogen and Sulfur Compounds from Fluids, of which improvements the following is a specification.

The invention described herein has for its object the recovery and separation of hydrogen sulfid, carbon dioxid and hydrocyanic acid from fluids containing the same by treating such fluids with a suitable, simple reagent such as sodium or potassium zincate, whereby insoluble sulfids and soluble cyanid compounds are formed in resulting liquor.

The invention is hereinafter more fully described and claimed.

In the accompanying drawing forming a part of this specification is shown a form of apparatus, which may be employed in the practice of my invention.

When treating gas, the washer 1 which may be of any known or suitable construction, is connected by a pipe 2 to any source of gas supply. While passing through the washer the gas is brought into intimate contact with a solution of sodium zincate, which is supplied from the tank 3 through the pipe 4 having a suitable controlling valve. The gas in passing through the washer is freed from the hydrogen sulfid, and hydrocyanic acid, and passes to the gas holder 4 or to a point or points of use. The liquor containing sodium zinc cyanid in solution, and zinc sulfid in suspension, is directed by pipe 5 having suital : controlling valves to one or the other of the tanks 6 and 7 as desired. If the liquor in the tanks 6 or 7 contains an excess of zincate in solution, a quantity of sodium sulfid solution sufficient to precipitate all the excess of zincate is allowed to flow from the tank 8 into the tank 6 or 7, the latter being connected to the tank 8 by pipes, having suitable valves. If, on the other hand, the liquor in the tanks 6 or 7 contains an excess of sodium sulfid, a quantity of sodium zincate solution is supplied either directly from the tank 3 or from tank 9, which is connected by pipes having controlling valves with the supply tank 3 and with the tanks 6 and 7.

After the desired reactions have occurred in the tank 6 or 7, the liquor therein is fed through a pipe 11 to a filter 10 of any construction suitable for the purpose. In the filter the insoluble zinc sulfid is separated out, while the filtrate consisting of a solution of sodium hydroxid and sodium cyanid passes through the pipe 12 to one or more closed receptacles 13, wherein the liquor can be heated by any suitable means to a sufficient temperature to effect in connection with metallic zinc which is placed in the boilers, a regeneration of the sodium zincate solution. In order to replace the sodium hydroxid lost in the formation of sodium cyanid, a suitable amount of sodium hydroxid is fed into the boiler 13 from a suitable source as tank 14 which is connected with the boiler. The regenerated sodium zincate solution is fed back to the tank 3 by a pump 15 or other suitable means.

As sodium cyanid accumulates in the liquor which passes to and through the filter 10, portions of the clear solution are transferred by a branch pipe 16 connected to the pipe 12, to an evaporator 17 where it is concentrated until the sodium cyanid crystallizes out. After cooling, the mother liquor and crystals are conducted to a drier 18 preferably of the centrifugal type, whereby the mother liquor is driven off. After separation has been effected, the crystals are dried, and the mother liquor conveyed from the tank 19 by the pipe 20 and pump 15 to the tank 3. The precipitate segregated by the filter 10 is then subjected to sufficient heat in the roasting furnace 21 and the gases principally sulfur dioxid mixed with oxygen and nitrogen from the air used in the furnace are subjected to the proper treatment for the conversion of the sulfur dioxid into sulfuric acid. The zinc oxid formed in the roasting furnace is subjected to suitable treatment in a plant indicated at 22 for its reduction to metallic zinc which can be used in the boiler 13 for the regeneration of the sodium zincate as hereinbefore stated.

In case it is desired to treat the gas with a solution of sodium hydroxid and the resulting liquor with sodium zincate, the tank 3 is charged with a solution of sodium hydroxid which is allowed to flow into the washer 1 where it will be brought into intimate contact with the gas passing therethrough. The resulting solution of sodium sulfid, and cyanid with an excess of hydroxid is run into the tanks 6 and 7 and there treated with sodium zincate solution which is drawn from one or both of the tanks 8 and 9, sodium sulfid not being required in this form of the method. Only a sufficient quantity of the sodium zincate solution is fed into the tanks 6 and 7 to precipitate all of the sulfid in solution. The liquor containing sodium cyanid and hydroxid in solution and insoluble zinc sulfid in suspension is then transferred from tanks 6 and 7 to the filter 10. The clear liquor passes from the filter into a storage receptacle, which may be one of the boilers 13 from which it is returned to tank 3. The other boiler may be used for the preparation of sodium zincate, which when formed is transferred to one of the tanks 8, 9. As the sodium cyanid in solution increases, it may be recovered by evaporating portions of the clear solution in the evaporator 17 and separating the crystals from the mother liquor in the separator and drier 18. The zinc sulfid segregated by the filter may be treated as hereinbefore described.

It will be readily understood from the foregoing that my improved process is applicable to the treatment of either a gas or a liquid containing hydrogen-sulfid, and hydro-cyanic acid, or soluble cyanids, and sulfids, with sodium or potassium zincate, either separately or together, for the recovery from such fluids in a separable form, of one or more of the above substances. While preferable, it is not necessary to remove the ammonia from the gas before the treatment with the zincate.

The invention described herein is not restricted to the steps specifically described, but consists broadly in the treatment of fluids with a soluble reagent without the necessary presence of any other substance than that of said reagent for the recovery of hydro-cyanic acid, and hydrogen-sulfid, or one or more of such substances in a form that will readily permit of their segregation.

Although in the specific description of my improved process, reference has been made to sodium zincate, it will be understood that any equivalent reagent as potassium zincate, can be employed, and further, that a plurality of zincates, or equivalent reagents, may be employed simultaneously if desired.

It has been proposed to remove soluble cyanogen compounds from gas by the addition of an iron salt to the water to be employed for the extraction of ammonia from the gas, but only in such proportions as to combine with the cyanids, and not with any other substances contained in the gas. This process which also requires the presence of ammonia, differs from that claimed herein, in that only one substance is removed from the gas by the conjoint action of two substances. Whereas, by employing a soluble zincate, or its equivalent reagent alone, as described, a plurality of substances are simultaneously rendered recoverable.

The term sodium-cyanid, as used herein, is not to be understood to signify a pure compound. I have found that the material as actually produced, contains variable amounts of zinc; but the presence of this or other impurities does not interfere with its commercial use nor in any way change the process as herein described.

I claim herein as my invention:

1. The process of treating a fluid containing hydrocyanic acid and hydrogen sulfid, or soluble cyanids, and sulfids, which consists in subjecting the fluid to the action of a re-agent in solution, adapted to and in such proportions as to combine directly with all of the said substances, to form a soluble cyanid and an insoluble sulfid, segregating the insoluble compounds and extracting the cyanid compounds from the liquor.

2. The process of treating fluids containing hydrocyanic acid and hydrogen sulfid, or soluble cyanids, and sulfids, which consists in treating the fluid with a zinc compound in solution adapted to combine directly with the contained substances to form a soluble cyanid and an insoluble sulfid, segregating the insoluble compounds and extracting cyanid compounds from the liquor.

3. The process of recovering hydrocyanic acid from fluids which consists in subjecting the fluid to the action of a zincate solution.

4. The process herein described which consists in subjecting gases containing hydrocyanic acid to the action of a zincate solution.

5. The process herein described which consists in subjecting a fluid containing hydrocyanic acid and hydrogen sulfid to the action of a zincate solution thereby forming an insoluble sulfid compound and segregating such compound.

In testimony whereof, I have hereunto set my hand.

FREDERICK W. SPERR, Jr.

Witnesses:
ELIZABETH E. MOORHEAD,
THOS. B. JOYCE.